United States Patent [19]

McCracken

[11] Patent Number: 4,789,004
[45] Date of Patent: Dec. 6, 1988

[54] APPARATUS AND METHOD FOR INCREASING FLUID FLOW RATE IN A FLOW PATH INCLUDING A CURVED FLOW PATH SECTION

[76] Inventor: Laurence W. McCracken, Rte. 1, Box 298, Chapel Hill, N.C. 27514

[21] Appl. No.: 88,800

[22] Filed: Sep. 24, 1987

Related U.S. Application Data

[62] Division of Ser. No. 25,617, Mar. 13, 1987, Pat. No. 4,708,098.

[51] Int. Cl.$^4$ .............................................. F15C 1/04
[52] U.S. Cl. .................................... 137/827; 137/825; 123/52 M
[58] Field of Search ............. 123/52 M; 137/825, 827, 137/14

[56] References Cited

U.S. PATENT DOCUMENTS

| | | | |
|---|---|---|---|
| 1,288,266 | 12/1918 | Stokes | 137/14 |
| 2,692,800 | 10/1954 | Nichols et al. | 137/14 |
| 3,469,591 | 9/1969 | Odendahl | 137/14 |
| 4,020,859 | 5/1977 | Malphettes et al. | 137/14 |
| 4,469,067 | 9/1984 | Futakuchi | 123/432 |
| 4,470,391 | 9/1981 | Ishida | 123/308 |
| 4,483,282 | 11/1984 | Sakaoka | 123/52 MB |
| 4,497,288 | 2/1985 | Nakano | 123/52 M |

FOREIGN PATENT DOCUMENTS

3140352  4/1983  Fed. Rep. of Germany .
201930 11/1984  Japan .

Primary Examiner—A. Michael Chambers
Attorney, Agent, or Firm—Steven J. Hultquist

[57] ABSTRACT

An internal combustion engine in which a minor portion of the air-fuel mixture being flowed to the combustion engine chamber is withdrawn through a fluid withdrawal passage. The fluid withdrawal passage enters the curved outlet section of the intake passage, with its inlet at the convexly curved interior surface of such outlet. The side stream of air-fuel mixture is withdrawn by application of suction to the outer end of such fluid withdrawal passage. Withdrawal of a side stream of air-fuel mixture in this fashion has been found to substantially increase the rate of flow of air-fuel mixture to the combustion chamber during the charging step of engine operaton. The fluid withdrawal apparatus and method of the invention are potentially applicable to many other types of fluid flow systems comprising a flow path with a curved portion, downstream of which it is desirable to increase fluid velocity and volumetric flow rate.

8 Claims, 3 Drawing Sheets

APPARATUS AND METHOD FOR INCREASING FLUID FLOW RATE IN A FLOW PATH INCLUDING A CURVED FLOW PATH SECTION

CROSS-REFERENCE TO RELATED APPLICATION

This is a division of co-pending application Ser. No. 07/025,617 filed Mar. 13, 1987 for: "APPARATUS AND METHOD FOR INCREASING POWER OUTPUT OF AN INTERNAL COMBUSTION ENGINE," now U.S. Pat. No. 4,708,098, issued Nov. 24, 1987.

BACKGROUND OF THE INVENTION

1. Field of the Invention

This invention relates broadly to a means and method for increasing the rate of fluid flow along a flow path downstream of a curved flow passage, and more specifically relates to internal-combustion engines, and to a means and method for increasing the rate of air flow into the combustion chamber of such an engine to increase the power output of the engine.

2. Description of the Related Art

In the development of internal-combustion engines, continuing effort has been focused on improving such engines to increase their power output.

Particular attention has been directed to such improvements in the field of internal-combustion engines for compact cars, motorcycles, and internal-combustion engine-powered consumer products, e.g., portable generators, paint sprayers, lawn mowers, edgers, and the like. In these applications, size and weight considerations are important, often critical, to the commercial viability and consumer acceptance of the product in which the internal-combustion engine is employed.

In addition to providing advantages of size reduction of the engine in the aforementioned applications, improvement of the power output of the internal-combustion engine likewise provides the benefit of improved fuel consumption characteristics for the engine Such increases in combustion efficiency of the engine mean that less fuel is required for a given duration of operation, or alternatively, a longer duration of operation can be achieved on the same amount of fuel.

Among the aforementioned internal combustion engine applications, particularly significant effort has been expended to achieving enhanced power output in high performance motorcycle engines, where considerations of size, weight, and horsepower are paramount. The U. S. patents hereinafter described relate to internal combustion engine improvements particularly applicable to motorcycles.

U.S. Pat. No. 4,470,391 to T. Ishida discloses an air-fuel mixture intake construction for an internal-combustion engine, utilizing a so-called induction passage. One end of such passage opens into a secondary intake passage, upstream of a secondary throttle valve therein, and the other end opens immediately upstream of the intake valve for the combustion chamber. The secondary intake system supplements the primary intake system, and furnishes air-fuel mixture under medium and high engine loads.

In operation, the induction passage ejects air and/or air-fuel mixture into the combustion chamber to create swirling flows therein. This is said to promote fuel combustion in the combustion chamber.

The patent also discloses the use of plural induction passages for multi-cylinder engines, similarly constructed with their distal ends opening immediately upstream of the intake valves. The induction passages in the disclosed construction are connected at their other ends (opposite the distal ends) to a common passage which communicates with primary intake passages immediately downstream of a primary throttle valve and which also communicates with a slow fuel supply passage in the secondary intake passage. The induction passages comprise pipes opening into the secondary intake passages immediately upstream of the secondary throttle valves.

Although this patent discloses (at column 6, lines 26–30) that a high vacuum is developed at the induction pipe on the intake stroke during the idling mode of operation, such vacuum conditions appear localized in the intake passage so as to cause air or lean air-fuel mixture to flow through the induction passage. As stated in column 6, at lines 61–68, the "vacuum developed at the induction pipe causes air or a lean air-fuel mixture to flow...into the...passageway 84, and the pipe 85 [the induction passageway], from which the air or air-fuel mixture is ejected rapidly into the combustion chamber 2 circumferentially thereof in the direction in which the air-fuel mixtures are fed from the intake ports 3, 4."

U.S. Pat. No. 4,488,519 to H. Kishida discloses an internal combustion engine configuration in which a check valve is deployed in the intake passage upstream of the combustion chamber. The check valve prevents reverse flow from the chamber through the intake passage, and a plenum chamber communicates with the intake passage downstream of the check valve. In this construction, the plenum chamber is provided with flow through a relatively small pipe having an inlet disposed immediately adjacent to the intake valve 23 and downstream of the reed-type check valve 24 (Column 3, line 1–5).

Column 3, lines 33–38 of this patent disclose that when the "intake valve 23 closes, there will be a negative pressure existent in the plenum chamber 26 which tends to cause a continued flow through the induction passage and which will tend to prevent the reed-type check valve 24 from completely closing, particularly at higher speeds."

U.S. Pat. No. 4,530,325 to Y. Namba, et al. discloses what is termed a suction system for an internal-combustion engine. The term "suction" used in this context, however, refers to intake flow of air-fuel mixture into the combustion chamber.

This is apparent from the disclosure in the patent at column 2, lines 43–54, where it is disclosed that a injection nozzle pipe forms the outlet end portion of the sub-suction path in the engine. The pipe has a nozzle portion with reduced diameter at its tip such that it is opened immediately upstream of the suction valve (intake valve). This passage specifically states that the "injection nozzle pipe 23 is directed substantially in the tangential direction of the wall of the cylinder 1 so that a swirl of the suction gases is generated around the axis of said cylinder 1 in the combustion chamber."

Further, in describing the operation of the engine comprising the disclosed improvement, this patent at column 3, lines 31–40 discloses that in such engine, "during the suction stroke having the suction valve 10 opened, the combustion chamber 4 is supplied with an air-fuel mixture from the main suction path 5, whereas a gas is injected from the sub-suction path 22 into the combustion chamber 4. By the injection of the gas from the sub-suction path 22, the mixture sucked into the combustion chamber 4 is swirled around the axis of the cylinder 1 so that the burning velocity is accelerated."

As is well known, the amount of power that an internal combustion engine is capable of developing is directly related to the amount of air or air-fuel mixture that can pass through the intake passage of the engine during the inlet cycle. Thus, if a suitable means or method is found to increase this flow of air or air-fuel mixture into the combustion chamber, more power output will be obtained.

For many years, one of the standard approaches to increasing air flow in intake passages of internal combustion engines has involved "porting" or otherwise reshaping, recontouring, or polishing the intake ports of the internal combustion engine, including the valve seat area. While major air flow gains are achievable by such approaches, they are generally expensive, time-consuming, and ill-suited to mass production.

Accordingly, there is a continuing need in the internal combustion engine art for improvements in engine construction and operation which will increase the rate of air and air-fuel mixture flow into the combustion chamber, to thereby realize improvements in power output of the engine.

It therefore is an object of the invention to provide a means and method for effecting improvement in the rate of air flow and flow of air-fuel mixture into the combustion chamber of an internal combustion engine, to increase its power output.

It is a further object of the invention to provide a means and method of the type described above, which is readily implemented in the retrofitting of existing internal combustion engines, and which is well suited for the construction and operation of new engines fabricated by mass production techniques.

It is a still further object of the invention to provide a means and method for increasing fluid flow rate in a flow path downstream of a curved portion of the path.

Other objects and advantages of the invention will be more fully apparent from the ensuing disclosure and appended claims.

SUMMARY OF THE INVENTION

In one aspect, the invention relates to an internal combustion engine including:

a combustion chamber;

an intake port through which an air/fuel mixture is introduceable into the combustion chamber;

an intake passage communicating with the intake port for flowing the air/fuel mixture to the combustion chamber; and an intake valve reciprocally moveable between (a) a first open position for introduction of the air/fuel mixture into the combustion chamber via the intake port, and (b) a second closed position, accommodating combustion of the air/fuel mixture in the combustion chamber;

wherein the intake passage has a curved portion in the vicinity of the combustion chamber, comprising a convexly curved interior surface;

in which the improvement of the invention comprises:

a fluid withdrawal passage entering the curved portion of the intake passage at its convexly curved interior surface, and having an outer end external to the intake passage; and means for applying suction to the outer end of the fluid withdrawal passage, during flow of the air/fuel mixture through the intake passage from the intake port to the combustion chamber while the intake valve is in said first position, to withdraw a minor portion of the air/fuel mixture and increase the rate of said flow of air/fuel mixture to the combustion chamber.

A method aspect of the invention relates to the operation of an internal combustion engine, including:

a combustion chamber;

an intake port through which an air/fuel mixture is introduceable into the combustion chamber;

an intake passage communicating with the intake port for flowing the air/fuel mixture to the combustion chamber; and an intake valve reciprocally moveable between (a) a first open position for introduction of the air/fuel mixture into the combustion chamber via the intake port, and (b) a second closed position accommodating combustion of the air/fuel mixture in the combustion chamber;

wherein the intake passage has a curved portion in the vicinity of the combustion chamber, comprising a convexly curved interior surface;

wherein the improvement of the invention comprises:

providing a fluid withdrawal passage entering the curved portion of the intake passage at its convexly curved interior surface, and having an outer end exterior to the intake passage; and withdrawing a minor portion of the air/fuel mixture through the fuel withdrawal passage during flow of the air/fuel mixture through the intake passage from the intake port to the combustion chamber while the intake valve is in said first position, to increase the rate of said flow of air/fuel mixture to the combustion chamber.

In a preferred embodiment of the apparatus and method broadly described above, from about 0.1% to about 10%, and most preferably about 0.5% to about 5%, of the air-fuel mixture from the intake passage is withdrawn through the fluid withdrawal passage while the intake valve is in the aforementioned first position, and suction is applied to the fluid withdrawal passage, to provide a negative pressure differential over the length of the passage, of from about 0.001 to about 10.0 inches mercury, and preferably from about 0.5 to about 2 inches mercury. As used in this context, the negative pressure is the pressure measured at the outlet of the fluid withdrawal passage, relative to the pressure of the air-fuel mixture in the intake passage, from which fluid is withdrawn.

In another, broader aspect, the invention relates to a fluid flow system comprising a flow path having an intermediate curved portion including a convexly curved interior boundary, in which the improvement comprises:

a fluid withdrawal passage entering the curved portion of the flow path at its convexly curved interior boundary, and having an outer end external to the flow path; and applying suction, by suitable means, to the outer end of the fluid withdrawal passage, during flow of the fluid through the flow path, to withdraw a minor portion of the fluid and increase the rate of said flow of fluid downstream of said curved portion of the flow path.

Other aspects and features of the invention will be more fully apparent from the ensuing disclosure and appended claims.

DETAILED DESCRIPTION OF THE INVENTION, AND PREFERRED EMBODIMENTS THEREOF

Figure 1:
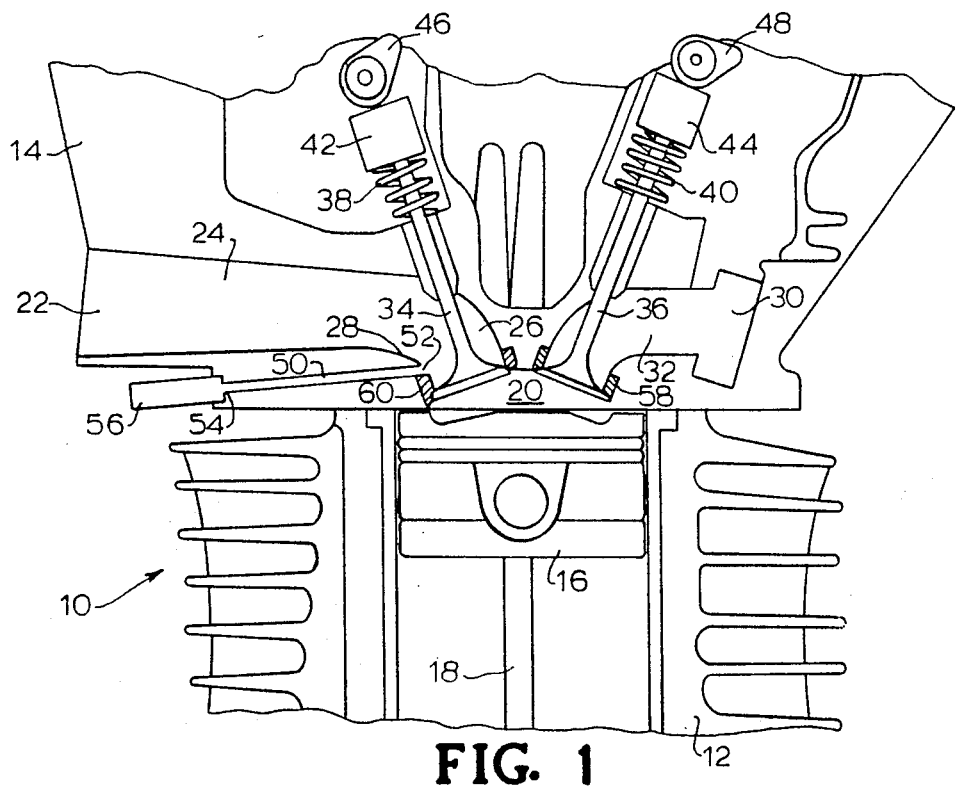
FIG. 1 is a cross-sectional elevation view of the cylinder head portion of an internal combustion engine featuring the improvement of the invention.

The present invention is based on the surprising and unexpected discovery that the air-fuel mixture flow rate into the combustion chamber of an internal combustion engine may be greatly improved when the intake passage is modified at its curved outlet, in the vicinity of the combustion chamber, by provision of a fluid withdrawal passage entering the curved outlet, and the application of suction to the outer end of the fluid withdrawal passage, to withdraw a minor portion of the air-fuel mixture being flowed through the intake passage from the intake port to the combustion chamber.

Such improvement in air-fuel flow rate is particularly surprising and unexpected in character, since the prior art, as exemplified by the patents described in the "Background of the Invention" section hereof, has taught that the combustion efficiency of internal combustion engines may be improved by additional injection of air or air-fuel mixture in the vicinity of the combustion chamber. The fluid injection teachings of the prior art are thus opposite in character to the air-fuel mixture withdrawal feature of the present invention.

Internal combustion engines to which the air-fuel mixture suction withdrawal feature of the present invention may be utilized, include those with the following elements: (a) a combustion chamber; (b) an intake port through which an air-fuel mixture is introduceable into the combustion chamber; (c) an intake passage communicating with the intake port for flowing the air-fuel mixture to the combustion chamber, the intake passage having a curved outlet in the vicinity of the combustion chamber, and the curved outlet comprising a convexly curved surface; and (d) an intake valve reciprocally movable between (i) a first open position for introduction of the air-fuel mixture into the combustion chamber via the intake port, and (ii) a second closed position, accommodating combustion of the air-fuel mixture in the combustion chamber.

The improvement of the invention, as applied to an internal combustion engine of the type described above, comprises: a fluid withdrawal passage entering the curved outlet of the intake passage at its convexly curved interior surface, and having an outer end external to the intake passage; and means for applying suction to the outer end of the fluid withdrawal passage, during flow of the air-fuel mixture through the intake passage from the intake port to the combustion chamber while the intake valve is in the first position, to withdraw a minor portion of the air-fuel mixture and increase the rate of the flow of air-fuel mixture to the combustion chamber, whereby the power output of the engine is increased.

As used herein, the "convexly curved interior surface" of the intake passage's curved outlet refers to the region in the curved outlet having a generally convex surface curvature. In other words, the curved outlet of the intake passage in the vicinity of the combustion chamber will, as a result of the curvature of such portion of the intake passage, have interior surfaces which are similarly curved, such that on opposite interior walls, there will be respective concave and convex curvatures, and it is to the latter surface type that the phrase "convexly curved interior surface" refers. For example, in the internal combustion engine shown in simplified form in FIG. 1, the convexly curved interior surface is denoted by reference numeral 28.

The size and shape of the fluid withdrawal passage employed to withdraw air-fuel mixture from the intake passage, during flow of the air-fuel mixture through the intake passage from the intake port to the combustion chamber, may vary widely, depending on the size and shape of the intake passage and the intake port, the flow rate of air-fuel mixture which is employed in the normal operation of such engine, the degree of suction applied to the fluid withdrawal passage, etc. It will be appreciated that these features may vary widely depending on the specific engine and its mode of operation. Nonetheless, in any given engine application, the fluid withdrawal system of the present invention may be straightforwardly applied and readily optimized, it being necessary only to measure volumetric air flow into the intake port in normal (unenhanced) operation and to measure same when the fluid withdrawal system of the invention is utilized, to determine optimum geometry, suction, amount of air-fuel mixture withdrawn, and the like. As will be appreciated by those skilled in the art, such determinations may thus readily be made by the expedient of a few simple measurements and test determinations, without undue experimentation.

By the implementation of the fuel withdrawal system of the present invention in an internal combustion engine of the type described hereinabove, comprising an intake passage having a curved outlet in the vicinity of the combustion chamber, with the curved outlet having a convexly curved interior surface, a fluid withdrawal passage is employed, which enters the curved outlet of the intake passage at such convexly curved interior surface. The fluid withdrawal passage is positioned with its outer end external to the intake passage. Suction is applied, such as by means of a vacuum pump, or an exhaust blower powered by the engine, such as by means of a power take-off arrangement, e.g., a belt and pulley assembly coupled to the engine shaft, or in any other suitable manner. It is also within the purview of the invention to utilize passive suction means, such as in automotive or other vehicular applications, in which a stream of the air-fuel mixture is withdrawn from the intake passage by means of aspiration devices or other passive means of fluid withdrawal.

Regardless of the specific means or method employed to effect the withdrawal of a minor portion of the air-fuel mixture from the air-fuel mixture being flowed through the intake passage from the intake port to the combustion chamber of the engine, the suction applying means are constructed and arranged to provide a negative pressure at the outlet of the fluid withdrawal passage relative to pressure of the air-fuel mixture within the intake passage. Although, as indicated, the suction pressure differential may vary widely depending on the specific engine and operational mode, degree of enhancement desired, etc., it has been found generally useful in the broad practice of the invention to employ a negative pressure differential across the fluid withdrawal passage (outlet relative to inlet) of from about 0.001 to about 10.0 inches mercury, and preferably from about 0.5 to about 2 inches mercury.

In like manner, the exact amount of air-fuel mixture withdrawn from the intake passage, as a minor portion of the stream being flowed to the combustion chamber, from the intake passage may vary widely depending on the same factors as noted in the preceding paragraph, but in the broad practice of the present invention it has been found generally useful to withdraw from about 0.1 to about 10%, and preferably from about 0.5 to about 5%, of the air-fuel mixture from the intake passage through the fluid withdrawal passage. For example, in a 1984 Kawasaki ZX 900A1 900cc motorcycle engine in which the air flow rate into the intake passage of the engine was 100 cubic feet per minute (CFM), withdrawal of air-fuel mixture at a volumetric flow rate of 2 CFM was advantageous for achieving a highly beneficial enhancement of power output.

As indicated, the fluid withdrawal passage enters the curved outlet of the intake passage at its convexly curved interior surface. While it is generally satisfactory to position the inlet of this fluid withdrawal passage at the inner wall, i.e., flush with the convexly curved interior surface of the intake passage, in some instances, it may be advantageous to extend the fluid withdrawal passage from the convexly curved interior surface into the intake passage. Where the passage is extended from the convexly curved interior surface into the intake passage, the fluid withdrawal passage may be provided by a separate tubular element extending into the curved outlet of the intake passage. In such instance, it will of course be desirable to avoid the presence of sharp edges, surface irregularities, etc., on such tubular element, which may interfere with or otherwise adversely affect flow in the intake passage or in the fluid withdrawal passage. By contrast, where the fluid passage has an inlet which is flush with the convexly curved interior surface, the fluid withdrawal passage may be simply formed by a passage bored or drilled through the cylinder head, so as to be in gas flow communication with the curved outlet of the intake passage, and provided with a suitable fitting at the exterior surface of the cylinder head communicating with such passage, for attachment of a conduit to a suction applying device, or direct attachment of suction applying means, as appropriate.

In applications where it is found advantageous to extend the withdrawal passage inwardly from the convexly curved interior surface into the intake passage, it will be appreciated that the projection of the withdrawal passage from the intake passage's walls should not be so great as to induce turbulence, eddy formation, or other disruption of the flow to such extent as to retard the air-fuel flow rate into the combustion chamber, since the advantages otherwise achievable in the practice of the invention may be diminished or even eliminated. In the preferred practice of the invention, the fluid withdrawal passage has an inlet which is flush with the convexly curved interior surface of the intake passage's outlet portion.

In some instances, it has been found advantageous to provide the fluid withdrawal passage with a flared inlet at the convexly curved interior surface. The specific character and advantages of such flared inlet feature will be more fully described in connection with FIG. 5 hereinafter.

In the operation of an internal combustion engine featuring the fluid withdrawal system of the present invention, suction is applied to the fluid withdrawal passage, or passages, if a plurality of such means is desired, and a minor portion of the air-fuel mixture is withdrawn. With the application of such suction, a significant improvement in the volumetric flow rate of air flowing through the intake port may be achieved. Such flow rate improvement becomes increasingly evident at larger intake valve openings, the extent of opening being hereinafter described in terms of "valve lift", as conventionally employed in the internal combustion engine art to denote the linear displacement of the intake valve from its associated valve seat, port, as measured in the direction of travel of the vale as it is retracted from the valve seat to provide for ingress of air-fuel mixture into the combustion chamber.

For example, an internal combustion engine may be arranged with a cam shaft to effect opening of the valve, and the maximum lift of the valve in such illustrative system may be on the order of about 0.400 inch, such that the enhancement of the invention may be apparent beginning at a valve lift of about 0.200 inch, with the effect becoming increasingly great with increasing valve lift. In the internal combustion engines studied to date, the rates of increase of volumetric air flow rate is not directly proportional to valve lift, since most air flow takes place at larger valve lift values. This is apparent from performance curves showing volumetric flow rate plotted as a function of valve lift, by which the air flow over a given lift range may be calculated by integration, as the area under such flow/lift curve.

According, there appears to be a threshold value of suction, beyond which further increase will result in substantial enhancement of volumetric air flow rate. The enhancement effect has been generally observed to increase with further increase in suction (degree of vacuum), but to be limited at an upper suction value, beyond which significant additional increases in volumetric air flow rate are not observed. As alluded to hereinabove, the amount of flow improvement which is achievable will depend on the structure and operation of the engine in which the improvement of the invention is employed. Among the structural factors of the engine which have been found to greatly influence the magnitude of flow improvement achievable is the shape of the convexly curved interior surface of the intake passage in the vicinity of the port "floor" at which suction is applied.

Referring now to the drawings, FIG. 1 shows a cross-sectional view, in elevation, of a portion of an internal combustion engine illustrating the features of the present invention.

The internal combustion engine 10 comprises cylinder 12 and cylinder head 14 which, together with the piston 16 aggregately form a combustion chamber 20. The piston 16 is mounted on connecting rod 18 joined to a suitable crankshaft (not shown) and arranged for reciprocating movement in a well-known manner.

The cylinder head 14 is constructed with an intake passage 24 communicating with the intake port 22. The intake passage has a curved outlet 26 in the vicinity of combustion chamber 20, and the curved outlet comprises a convexly curved interior surface 28, as shown.

The cylinder head 14 also comprises an exhaust passage 32 communicating with exhaust port 30 and also curved in the vicinity of the combustion chamber 20.

Disposed at the outlet 26 of the intake passage 24, at the junction of the intake passage and combustion chamber 20, is a valve seat 60. The intake valve 34 is shown reposed against valve seat 60, whereby the intake passage is closed to flow of air-fuel mixture into the combustion chamber. Intake valve 34 is opened and closed by the action of a control assembly comprising return spring 38, valve guide 42, and cam 46.

In like fashion, exhaust valve 36 is shown at the inlet of the exhaust passage 32, reposed against valve seat 58.

Opening and closure of the exhaust valve is controlled by an assembly, analogous to that previously described in connection with the intake valve, comprising return spring 40, valve guide 44, and cam 48.

Figure 1A:
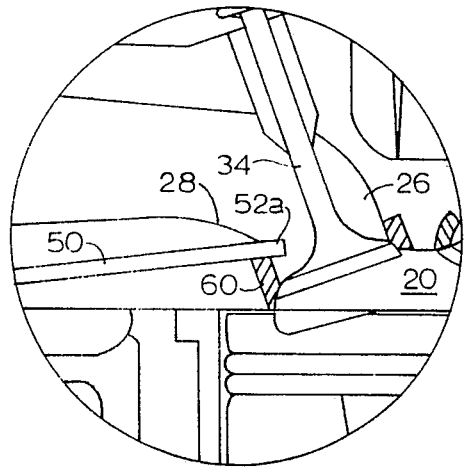
FIG. 1A is a cross-sectional elevation view of a portion of an internal combustion engine's cylinder head similar to that shown in FIG. 1, but with the modification of a fluid withdrawal passage extending into the intake passage.

In accordance with the present invention, a fluid withdrawal passage 50 enters the curved outlet 26 of the intake passage 24 at its convexly curved interior surface 28, and this passage has an outlet end 54 attached to a connection hose 56 by means of which suction is applied to the outer end 54 of the fluid withdrawal passage, during flow of the air-fuel mixture through the intake passage 24 into combustion chamber 20. The inlet end 52 of fluid withdrawal passage 50 is at the convexly curved interior surface 28. Although shown as a passage of circular cross-section, it will be appreciated that the fluid withdrawal passage may have any other suitable cross-sectional shape, as may be necessary or desirable in a given application. As mentioned, in some instances it may be desirable to form the fluid passage as a tubular member which passes through a suitable bore in the cylinder head and protrudes into the outlet 26 of the intake passage as shown in FIG. 1A, which is a cross-sectional elevation view of a modified portion of an internal combustion engine cylinder head similar to that shown in FIG. 1, and wherein all parts are numbered correspondingly with respect to FIG. 1, with the exception of the extended inlet end 52a of the fluid withdrawal passage 50.

Connecting hose 56 is joined to any suitable means for applying suction to the fluid withdrawal passage, such as a vacuum pump, exhaust blower, aspirating device, or any other suitable means for producing a negative pressure gradient along the fluid withdrawal passage 50 from its inlet 52 to its outlet 54.

The intake valve 34 is thus reciprocally movable between (a) a first open position for introduction of air-fuel mixture into the combustion chamber via the intake port, and (b) a second closed position accommodating combustion of the air-fuel mixture in the combustion chamber. Concurrently, the exhaust valve is similarly reciprocally movable between a first open position for exhaust of the combustion products out of the engine through the exhaust port, and a second closed position accommodating charging of the air-fuel mixture to the combustion chamber and combustion therein. The intake and exhaust valves are thus synchronously driven between their respective first and second positions to effect continuous internal combustion operation of the engine, in a well-known manner.

The withdrawal of a portion of the air-fuel mixture through the fluid withdrawal passage 50 occurs during flow of the air-fuel mixture through the intake passage to the combustion chamber while the intake valve is in the first position. The specific means for applying suction to the fluid withdrawal passage may be constructed and arranged to effect intermittent suction action in synchrony with the charging of air-fuel mixture, i.e., flow of air-fuel into the combustion chamber, being nonactuated during the period that charging of air-fuel mixture to the combustion chamber is not being effected. Alternatively, the suction applying mean may be continuously actuated, by way of simplifying the construction of the fluid withdrawal means, such that a minor portion of air-fuel mixture continues to be withdrawn even when the intake valve is in its closed position. Such continuous operation of the suction applying mean is permissible, since the net amount of the air-fuel mixture withdrawn in the fluid withdrawal passage is very small, typically comprising not more than about 2 to 5 percent of the volumetric flow rate of the air-fuel mixture flowed through the intake passage to the combustion chamber in the charging step.

Figure 2:
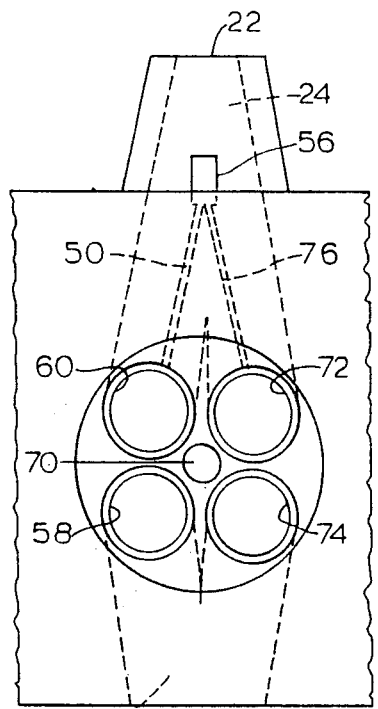
FIG. 2 is a partially sectioned plan view of a portion of the FIG. 1 internal combustion engine, showing the details of the intake and exhaust ports and their relationship to the air-fuel mixture withdrawal system according to the invention.

FIG. 2 is a plan view of a portion of the cylinder head 14 of the internal combustion engine shown in FIG. 1, and in which corresponding system elements are numbered correspondingly with respect to FIG. 1.

As shown in FIG. 2, the intake passage 24 communicating with inlet port 22 is branched to provide a dual, branched outlet of the intake passage at the combustion chamber, the valve seats 60 and 72 being associated with such intake passage branches, as shown. Similarly, the exhaust passage 32 is branched in the vicinity of the combustion chamber, with the valve seats 58 and 74 being associated with such branches. By this construction, the engine utilizes two intake and two exhaust valves to provide a particularly high performance engine configuration, such as may have particular utility in application to motorcycles and similar vehicles.

Centrally located between the valve seats 60, 72, 74 and 58, is spark plug opening 70, to accommodate a suitable spark plug to initiate combustion in the combustion chamber during operation of the engine.

Associated with the branched intake passage shown in FIG. 2 is a correspondingly constructed vacuum withdrawal passage, comprising the branches 50 and 76, as shown. Each of these branches communicates at its inlet end with the intake passage, at the convexly curved interior surface of the intake passage's curved outlet, as shown for the vacuum withdrawal passage 50 in FIG. 1. Each of the vacuum withdrawal passage branches 50 and 76 join with the connecting hose 56, which as indicated previously is joined to a suitable suction device.

Figure 3:
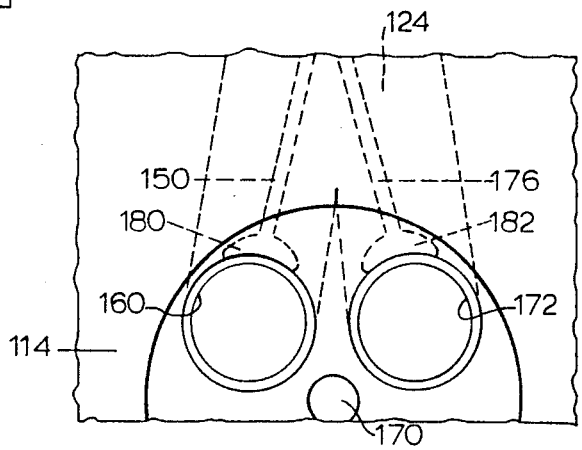
FIG. 3 is a plan view of an intake/exhaust port of an internal combustion engine according to another embodiment of the invention, in which the fluid withdrawal passage is provided with a flared inlet.

FIG. 3 shows a plan view of an alternative cylinder head construction similar to that shown in FIG. 2, and numbered correspondingly with respect to FIG. 2 by addition of 100 to the reference numerals of the corresponding system elements of FIG. 2.

FIG. 3 differs structurally from the FIG. 2 system, in the provision of flared inlets 180 and 182 on fluid withdrawal passages 150 and 176, respectively. As previously described, the fluid withdrawal passages may be provided as bored or drilled passages in the cylinder head, and in such instance, the flared inlets 180 and 182, may be formed by counter boring the inlets a short distance into the cylinder head from the convexly curved wall surfaces of the intake passages.

The provision of flared inlets, as shown in FIG. 3, is advantageous in certain applications of the present invention, since inlet effects otherwise associated with inlets of the vacuum withdrawal passages at the convexly curved wall surfaces or inlets of fluid withdrawal passages which protrude into the interior space of the curved outlet, are thereby substantially reduced or eliminated.

Regardless of whether a flared inlet is employed, the inlet of the fluid withdrawal passage is preferably devoid of any sharp edges or surface irregularities which might otherwise promote anomalous or adverse flow phenomena. Accordingly, when the fluid withdrawal passage is formed by a bored channel in the cylinder head, it may be desirable to polish the convexly curved interior surface of the intake passage in the vicinity of the fluid passage opening, to minimize such flow disturbances as may otherwise result from sharp corners at the intersection of the fluid withdrawal passage and the intake passage.

Figure 4:
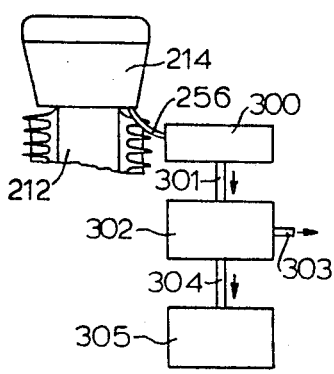
FIG. 4 is a schematic diagram of a portion of an internal combustion engine according to another embodiment of the invention, in which the fuel component of the air-fuel mixture withdrawn from the intake passage is separated to recover the fuel component thereof for reuse in the engine.

FIG. 4 is a schematic illustration of the fluid withdrawal system of the present invention, as associated with optionally employed fuel recovery means and emissions control apparatus.

The internal combustion engine is partially shown as comprising cylinder 212 and cylinder head 214, with connecting hose 256, joined at one end to the fluid withdrawal passage in the cylinder head as previously described, and joined at its opposite end to a vacuum source 300. The vacuum source may be constructed in any suitable manner. Alternatively, the vacuum source may comprise a vacuum pump driven by a power take-off associated with the engine shaft, or any other suitable means, useful to apply suction to the outer end of the fluid withdrawal passage, may be employed.

The minor portion of the air-fuel mixture withdrawn in connecting hose 256 by vacuum source 300 is passed from such vacuum source by conduit 301 to a fuel-vapor separator 302, as an optional system element. Although the advantages and benefits of the invention may be readily realized without use of the fuel-vapor separator 302, it being understood that the amount withdrawn in connecting hose 256 is a very small portion of the air-fuel mixture relative to the amount passed into the combustion chamber, nonetheless it may be desirable in certain instances to utilize such a phase separator, to comply with applicable legislative constraints on exhaust emissions, or to otherwise further improve the fuel economy and efficiency of the engine in operation.

The fuel-vapor separator may be constructed in any suitable fashion, e.g., as a centrifugal phase separation device, separator, whereby vapor is separated from the air-fuel mixture and discharged from the phase separator in conduit 303, with the fuel resulting from such separation being directed in conduit 304 to the fuel tank, schematically represented as block element 305.

Depending on the efficiency of the fuel-vapor separator 302, the vapor discharged from the separator conduit 303 may contain sufficient quantity of fuel component to warrant its further treatment, such as in an evaporative emissions control system of a conventionally used type, in which the fuel content of the exhaust from conduit 303 is further separated to yield a substantially fuel-free gas stream which is discharged from the system.

The features and advantages of the invention are further shown with reference to the following non-limiting examples.

EXAMPLE I

A 1984 Kawaski ZX 900Al four-cylinder engine head with its #3 intake port equipped with Kawaski ZX 1000 intake valves, was evaluated by measuring air flow rate through the #3 port, in actual cubic feet per minute (ACFM), as a function of valve lift, in thousandths of an inch (mils). The volumetric flow rate was measured at valve lift increments of 50 mils, over the range of from 50 to 450 mils.

This unmodified "stock" engine system is denoted hereinafter as "Engine A."

Following this test, Engine A was modified by "porting" with an air-driven die grinder, in which the "roof," or region of concave curvature at the curved portion of the intake passage was smoothed in contour, sharp metal surfaces were removed in the vicinity of the valve seat, and the "floor," or region of convex curvature at the curved portion of the intake passage, was "squared off" and broadened. In such manner, the radius of curvature of the floor region was generally decreased in a longitudinal direction of the intake passage and generally increased in a transverse direction thereof. The resulting intake passage wall surfaces were highly smooth in character, i.e., devoid of sharp surface irregularities, such as localized convexities or concavities.

Following this porting operation, the thus-modified engine head, denoted hereinafter as "Engine A'", was evaluated at the same valve lift values as the unmodified Engine A, to provide corresponding air volumetric flow rate values.

Finally, the ported engine head, Engine A', was further modified in accordance with the invention, by the provision of a fluid withdrawal passage of the general type shown in FIG. 2 hereof, having a main passage portion joined to branch lines going to the corresponding intake passage branches. In this configuration, the main passage portion of the fluid withdrawal passage was provided by drilling of a channel, approximately 0.16 inch in diameter, into the cylinder head, into which was inserted a tube having an outer diameter of approximately 0.16 inch and an inner diameter of about ⅛ inch. This tube extended into the cylinder head approximately ¼ inch, and protruded therefrom approximately ⅜ inch, to accommodate the attachment of suitable vacuum drawing means thereto. At its forward end, in the cylinder head, the main fluid withdrawal passage communicated with the branch lines. Each fluid withdrawal branch line was formed by drilling of a ⅛ inch diameter passage in the cylinder head from the main fluid withdrawal passage to the corresponding branch of the intake passage. The fluid withdrawal branch lines were each approximately 1.0 inch in length.

Vacuum then was generated by separate aspiration suction-generating means to provide a study vacuum suction pressure of 1.5 inches mercury, and suction was applied to the outer end of the tube forming the main passage portion of the fluid withdrawal passage. With the vacuum suction pressure being maintained at 1.5 inches mercury, the volumetric air flow rate was determined at 50 mil valve lift increments over the valve lift range of 250 to 450 mils. The engine head as so modified, to comprise a fluid withdrawal passage in accordance with the invention, is hereinafter designated Engine A".

The results of these various tests are set forth in Table I below, in which volumetric air flow rate through the intake passage is given for varying valve lift values.

TABLE I

Volumetric Air Flow Rate, Actual Cubic Feet Per Minute, for Varying Valve Lift, in Mils, for 1984 Kawasaki ZX 900A1 Four-Cylinder Engine Head, #3 Port with Kawasaki ZX 1000 Intake Valves

| Engine | Intake Valve Lift, Mils | | | | | | | | |
|---|---|---|---|---|---|---|---|---|---|
|  | 50 | 100 | 150 | 200 | 250 | 300 | 350 | 400 | 450 |
| Engine A, volumetric air flow rate, ACFM | 21.7 | 45.4 | 66.8 | 82.9 | 94.7 | 97.5 | 96.9 | 96.4 | 96.4 |
| Engine A', volumetric air flow rate, ACFM | 21.5 | 45.1 | 66.0 | 82.4 | 96.4 | 104.2 | 104.7 | 104.2 | 103.6 |
| Engine A", volumetric air flow rate, ACFM | — | — | — | — | 98.0 | 109.2 | 118.1 | 122.5 | 123.3 |

As shown by the values in Table I, the engine system utilizing the fluid withdrawal passage of the present invention (Engine A") achieves a substantial increase in volumetric air flow rate relative to the ported system (Engine A') and the unmodified engine system (Engine A), at the same corresponding valve lift values.

The magnitude of improvement in volumetric air flow rate achieved by the present invention is substantial, surprising and unexpected, being contrary to the intuitive expectation that removal of a portion of the fluid flow stream from the intake passage will result in a decreased volumetric air flow rate through the intake passage of the engine.

EXAMPLE II

In this evaluation, the volumetric airflow rate through the intake passage of variously configured engine heads was measured as a function of intake valve lift.

The engine employed in all tests was a 1980 Suzuki GS 1100 ET 1100cc four-cylinder engine, in which volumetric air flow rate was measured at the number 3 intake port.

The unmodified head of this engine was initially tested to determine its flow characteristics (Run 1). Next, a ⅛ inch diameter hole was bored through the cylinder head into the intake passage at the floor thereof, and this hole was plugged at its exterior end (Run 1A); the reason that the hole was plugged was to determine if any hydrodynamic effect resulted merely from the presence of the opening in the intake passage, i.e., without any flow of fluid therethrough.

Next, the hole was uncovered and air flow rate through the intake passage was measured, with a 1.5 inch mercury vacuum drawn on the ⅛ inch diameter fluid withdrawal passage (Run 1B).

Runs were then made on a same type engine head, which had been ported in a manner generally similar to that described in Example I, but without squaring off the floor region in the intake passage, and in which a ⅛ inch hole was drilled through the cylinder head into the convex surface region of the intake passage to provide a fluid withdrawal passage. At its intersection with the intake passage wall surface, the fluid withdrawal passage was provided with a flared inlet of elongated shape, having a major axis approximately 1 inch in length and oriented parallel to the face of the cylinder head. The minor axis of this flared inlet was ⅛ inch in length, and the flared inlet had a depth of approximately 1/32 inch. The ends of the flared inlet in plan view were rounded, to provide a "race track"-type profile at the intersection of the flared inlet with the intake passage wall, and the inner end of the drived vacuum withdrawal passage was generally centrally located in the flared inlet. In the first of two runs using this engine head, the outer end of the fluid withdrawal passage was plugged (Run 2), to determine whether the mere presence of the flared inlet and fluid withdrawal passage would affect the flow characteristics of the intake passage relative to the unmodified engine head of Run 1. The second of the runs using such flared inlet fluid withdrawal passage configuration (Run 2), employed the fluid withdrawal passage in an open state, with vacuum suction applied to its outer end at a vacuum pressure level of 1.5 inches mercury.

In a final set of runs, the engine head used in Runs 2 and 2A was modified by further porting, to square off the floor region of the curved portion of the intake passage. Such additional porting served to shorten the longitudinal axis of the flared inlet of the fluid withdrawal passage, to about ⅜ inch, while its minor axis dimension remained at about ⅛ inch. In a first run with this further ported engine head (run 3), the external end of the fluid withdrawal passage was plugged to prevent fluid flow, in the manner of runs 1A and 2. In a second run using this further ported engine head (Run 3A), the fluid withdrawal passage was unplugged and suction was applied thereto at a vacuum suction pressure of 1.5 inches mercury.

The results of the above-described runs are shown in Table II below, in which volumetric air flow rate, in actual cubic feet per minute, is tabulated as a function of intake valve lift, in mils, at 50 mil increments over the range from 200 to 350 mils.

TABLE II

Volumetric Air Flow Rate Through Intake Passage of 1980 Suzuki GS 1100 ET 1100 cc Four-Cylinder Engine, Measured at #3 Intake Port, For Various Intake Valve Lift Values, In Mils

| Run No. | Volumetric Air Flow Rate, In ACFM, For An Intake Valve Lift, In Mils, of: | | | |
|---|---|---|---|---|
| | 200 | 250 | 300 | 350 |
| 1 | 70.4 | 74.4 | 74.4 | 74.4 |
| 1A | 70.8 | 74.6 | 74.6 | 74.6 |
| 1B | 73.5 | 80.2 | 80.2 | 80.2 |
| % Improvement, Run 1B vs. 1A | 3.7 | 7.0 | 7.0 | 7.0 |
| 2 | 70.4 | 77.5 | 77.5 | 77.5 |
| 2A | 72.2 | 81.5 | 86.4 | 86.9 |
| % Improvement, Run 2A vs. Run 2 | 2.5 | 5.0 | 10.4 | 10.9 |
| 3 | 71.3 | 80.2 | 84.7 | 86.4 |
| 3A | 72.3 | 82.0 | 86.9 | 89.1 |
| % Improvement, Run 3A vs. Run 3 | 1.4 | 2.2 | 2.6 | 3.1 |

As is apparent from a comparison of the volumetric flow rate values for Runs 1 and 1A, the mere provision of a fluid withdrawal passage into the intake passage, but with such passage blocked to flow (Run 1A), provides substantially the same performance as the cylinder head lacking such passage (Run 1). In other words, the fact that a channel has been bored into the intake passage does not of itself provide any disruption or enhancement of flow of a significant character, but rather it is the withdrawal of fluid through such fluid withdrawal passage that provides the enhancement in accordance with the present invention. Thus, when the plugged fluid withdrawal passage is unplugged and fluid is withdrawn in accordance with the invention, a substantial improvement in volumetric air flow rate through the intake passage occurs, e.g., a 7% increase over the valve lift range of 250 to 350 mils.

A comparison of Runs 2 and 3, utilizing an engine head in which the intake passage has been ported, with the unported engine head of Run 1, shows that at higher intake valve lift values, over the range of from 250 to 350 mils, a significant improvement in air flow rate is achieved by the ported engine heads over the unported head. This is consistent with the prior practice in the art to contour intake passages by porting, to obtain a structure with better hydraulic flow characteristics than is provided by the original cast or rough-machined port and intake passage of the engine.

Nonetheless, the provision of a fluid withdrawal passage through which fluid from the intake passage is withdrawn, in accordance with the present invention, provides a further substantial improvement in the flow characteristics of such ported engine systems. For example, at an intake valve lift of 300 mils, the ported engine head of Run 2A, utilizing the present invention, exhibits a 10.4% improvement in volumetric air flow rate over the corresponding ported engine head of Run 2, lacking the fluid withdrawal feature of the invention.

In the further ported engine heads of Runs 3 and 3A, the use of the fluid withdrawal feature of the invention (Run 3A) likewise provided a modest improvement over the corresponding engine head lacking the fluid withdrawal feature of the invention (Run 3).

There is considerable "art" to the porting operation. As is well known, the magnitude of enhancement achievable by such operation generally depends in large part on the skill and experience of the person performing it. This is reflected by the volumetric air flow rate values obtained in Runs 3 and 3A. In these further ported systems, it appears that the floor region of the intake passage was flattened to a sufficient extent in the vicinity of the fluid withdrawal passage that proper laminar flow was not adequately developed upstream of the fluid withdrawal passage, in order to take full advantage of the fluid withdrawal operation, hence the modest improvement in volumetric air flow rate in Run 3A relative to Run 3. Nonetheless, Run 3A did achieve an improvement over the corresponding "less ported" engine system in Run 2A.

Again, it will be apparent to those skilled in the art that by the expedient of simple tests of variously ported intake passages, the extent of porting if any, which is useful to achieve optimal volumetric air flow performance with the fluid withdrawal feature of the present invention, is readily determinable.

EXAMPLE III

In this evaluation, a Kawasaki ZX 900A1 engine was tested in various runs, to measure the volumetric air flow rate through its #3 intake port, at 50 mil increments of intake valve lift, over the range from 50 to 450 mils.

Engine A was a stock engine of such type, which was not modified in any way.

Engine B was an engine of the same type, which was ported in a manner similar to that of Engine A' in Example I.

Engine C was similarly ported, but featured a ⅛ inch diameter fluid withdrawal passage communicating with the intake passage at its convex surface portion, with 1.5 inches mercury vacuum suction pressure being applied to the outer end of the fluid withdrawal passage, to effect fluid withdrawal therethrough.

The results of this evaluation are shown below in Table III.

TABLE III

Volumetric Air Flow Rate, ACFM, for Various Intake Valve Lift Values, in Mils, for a Kawasaki ZX 900A1 Engine, Measured at #3 Intake Port

| Engine | Volumetric Airflow Rate, ACFM, For A Valve Lift, In Mils, of: | | | | | | | | |
|---|---|---|---|---|---|---|---|---|---|
| | 50 | 100 | 150 | 200 | 250 | 300 | 350 | 400 | 450 |
| A | 21.7 | 45.4 | 66.8 | 82.9 | 94.7 | 97.5 | 96.9 | 96.4 | 96.4 |
| B | 21.5 | 45.1 | 66.0 | 82.4 | 96.4 | 104.2 | 104.7 | 104.2 | 103.6 |
| % Improvement, Engine B vs. Engine A | — | — | — | — | 1.8 | 6.5 | 7.5 | 7.5 | 7.0 |
| C | 21.5 | 45.1 | 66.0 | 82.4 | 98.0 | 109.2 | 118.1 | 122.5 | 123.3 |
| % Improvement, Engine C vs. Engine A | — | — | — | — | 1.7 | 4.6 | 11.4 | 15.0 | 16.0 |

Figure 5:
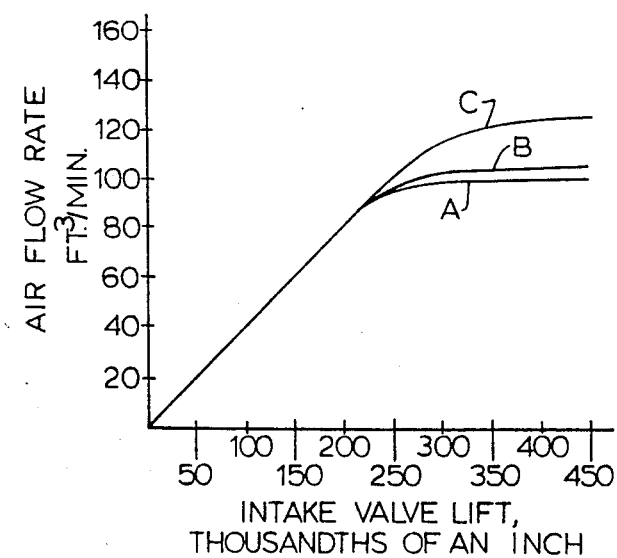
FIG. 5 is a graph of air flow, in cubic feet per minute, plotted as a function of valve lift, in thousandths of an inch, wherein curve A represents the behavior of an internal combustion engine not utilizing the improvement of the present invention, and curve B represents the behavior of the same engine utilizing the improvement of the present invention.

These results are also shown in FIG. 5, in which curve A represents the performance of Engine A, curve B the performance for Engine B, and curve C the performance for Engine C. As shown by the plot of FIG. 5, there is a threshold valve lift level, beyond which the volumetric air flow rate improvement afforded by the invention became highly substantial and increased with increasing valve lift. Thus, at a valve lift of 450 mils, the engine modified in accordance with the invention (Engine C) showed an improvement in volumetric air flow rate performance of 16.0% over the stock engine (Engine A), while the ported engine without the enhancement of the present invention (Engine B) showed only a 7% improvement over the stock engine.

EXAMPLE IV

Engine C from Example III next was run at varying air flow rates through the intake passage, at selected intervals over the range of 0 to 600 mils intake valve lift.

Three pairs of runs were conducted, each pair with a different suction pressure level applied to the outlet end of the intake passage.

The first pair of runs (Runs D and E) was conducted with a vacuum pressure applied to the outlet of the intake passage, of 5 inches of water negative pressure. The next pair of runs (Runs F and G) was carried out at 10 inches of water negative pressure, and the last pair of runs (Runs H and I) was conducted at 15 inches water negative pressure.

In Runs D, F, and H, the fluid withdrawal passage was plugged, and in Runs E, G, and I, 1.5 inches mercury negative pressure was applied to the external end of the fluid withdrawal passage, for operation in accordance with the present invention.

Figure 6:
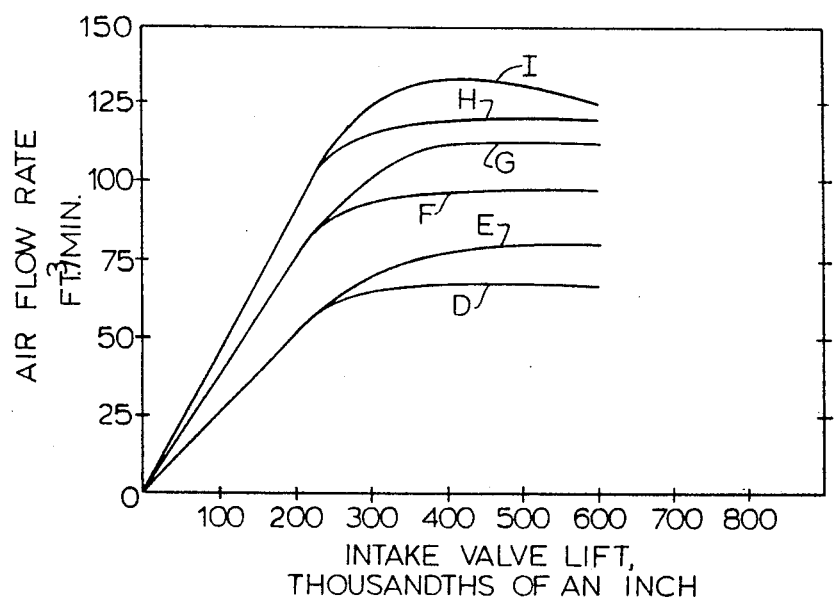
FIG. 6 is a graph of volumetric air flow rate, in actual cubic feet per minute, as a function of intake valve lift, in mils.

The results of this evaluation are shown in FIG. 6, which is a graph of volumetric air flow rate, in actual cubic feet per minute, as a function of intake valve lift, in mils. The performance curves for each of the Runs D-I are shown by the correspondingly identified curves D-I.

Each pair of such curves evidences the substantial improvement afforded by the fluid withdrawal feature of the invention, relative to the corresponding engine system in which such feature is not employed.

The foregoing examples show that the vacuum withdrawal feature of the present invention permits a significant increase in flow of air-fuel mixture to the combustion chamber, with correspondingly increased power output from the engine. As indicated herein above, the existence and magnitude of the improvement in air-fuel mixture flow rate and power output achieved by the present invention is indeed surprising and unexpected, in view of the teaching of the prior art to improve combustion efficiency and power output by additional injection of air or air-fuel mixture into the stream flowed to the combustion chamber, opposite to the fluid withdrawal feature of the present invention.

While I do not wish to be bound by any theory as regards the nature or mechanism of the improvement which is afforded by my invention, a possible fluid dynamics basis for such improvement is proposed below.

It is well established that when a flowing stream of fluid encounters a bend in its flow path, a restriction of flow will result as a result of the inertia of the fluid stream, with increasing degree of bending of the flow path resulting in increasing restriction of flow.

At the bend in the flow path, a pressure/velocity gradient will develop; high pressure, high velocity fluid will move along the outer radius or "roof" of the bend, while low pressure, lower velocity fluid will move along the inner radius, or "floor" of the bend. Associated with these extremes of flow behavior is the presence of a stationary boundary layer of fluid along the bend wall, as is well known. Such boundary layer has a minimum thickness dictated by the character of the fluid, the texture (smoothness) of the bend wall, and the pressure exerted on the bend wall by the fluid, due to its velocity and direction of flow.

At the bend in the flow path, the roof of the bend will experience high velocity fluid whose inertia pushes it into rather than along the bounding wall. The resulting pressure build-up associated with the fluid's resistance to "turning the corner," will greatly increase the thickness of the boundary layer of the fluid. Such increase in boundary layer thickness is proportional to the velocity, i.e., the higher the fluid velocity the thicker the boundary layer and, consequently, the greater the reduction in "effective" cross-sectional area for fluid flow, i.e., the area generally perpendicular to the flow direction, through which the fluid passes, exclusive of any localized stagnant areas or stationary boundary layers.

Concurrently, the floor of the bend will experience lower velocity fluid flow, relative to the bulk stream, so that laminar flow will not be maintained along the inside radius (convexly curved interior surface) of the bend, if the radius of curvature is too small or the fluid velocity too high. If flow separation occurs on the bend floor, the resulting turbulence which is generated will further reduce the effective cross-sectional area of the bend for fluid flow.

The application of vacuum to the bend floor at a point along its convexly curved interior surface, in the manner of the present invention, accomplishes the following:

(1) The flow stream along the bend floor will remain in a laminar flow regime at much higher flow velocities than would occur in the absence of such suction application, in addition to reduced turbulance and increased effective cross-sectional area for fluid flow.

(2) The application of suction will increase the density of the flow stream on the bend floor, thereby decreasing the density gradient across the bend by "pulling" a greater amount of fluid closer to the bend floor.

(3) By effecting movement of fluid in the flowing stream away from the roof and toward the floor of the bend, the pressure on the roof is reduced and consequently the boundary layer thickness on the roof is proportionally reduced, thereby increasing the "effective" cross-sectional area for flow.

Since in any fluid stream, turbulance increases as the square of the fluid velocity, any reduction in turbulance which is achievable becomes increasingly significant as velocity increases. It may be possible in the broad practice of the present invention to utilize suction withdrawal of fluid in ultra-high velocity intake passages, to achieve far superior charging of the combustion chamber than heretofore has been possible. Such "filling" of the combustion chamber would occur more rapidly, and at a higher velocity and turbulance level, than previously feasible. Consequently, "valve overlap," i.e., overlap in position of the intake and exhaust valves, may be able to be reduced to obtain better low end and mid-range power characteristics for the internal combustion engine. Such improvement would also achieve more complete combustion due to a more homogeneous, higher swirl mixture, allowing a retarded ignition timing to slow and broaden the combustion pressure peak of the burning fuel in the combustion chamber.

It will be further recognized that, although the invention has been described primarily in terms of application to internal combustion engines, its utility is not so limited. Rather, the fluid withdrawal method of the invention has potential applicability to any fluid flow system in which the flow is directed through a curved passage, and in which increased flow velocity and higher volumetric fluid flow rate is desired downstream of such curved section of the flow path. Examples of such alternative applications of the invention, possible within the broad scope thereof, include heating, ventilating, and air conditioning systems, oil pipeline networks, and medical fluid flow apparatus such as breathing machines, dialysis systems, etc.

Thus, a broad aspect of the invention relates to fluid flow systems of a type comprising a flow path having an intermediate curved portion including a convexly curved interior boundary, in which the improvement comprises:

a fluid withdrawal passage entering the curved portion of the flow path at its convexly curved interior boundary, and having an outer end external to the flow path; and applying suction, by suitable means, to the outer end of the fluid withdrawal passage, during flow of the fluid through the flow path, to withdraw a minor portion of the fluid and increase the rate of said flow of fluid downstream of said curved portion of the flow path.

Although preferred embodiments of the invention have been described in detail, it will be apparent that other variations, modifications and embodiments are possible, and accordingly, all such variations, modifications and embodiments are to be regarded as being within the scope of the invention.

What is claimed is:

1. In a fluid flow system comprising a flow path having an intermediate curved portion comprising an outer radius concave bounding surface and an inner radius convex bounding surface, wherein the inner and outer radius surfaces are similarly curved, the improvement comprising:
   (a) a fluid withdrawal passage having an inlet in the curved portion of the flow path at its inner radius convex bounding surface and an outlet external to the flow path; and
   (b) means for applying suction to the outlet of the fluid withdrawal passage during the flow of the fluid through the flow path, to withdraw a minor portion of the fluid and increase the rate of said flow of fluid through the flow path.

2. In a fluid flow system comprising a flow path having an intermediate curved portion comprising an outer radius concave bounding surface and an inner radius convex bounding surface, wherein the inner and outer radius surfaces are similarly curved, the improvement comprising:
   (a) providing a fluid withdrawal passage having an inlet in the curved portion of the flow path at its inner radius convex bounding surface and an outlet external to the flow path; and
   (b) applying suction to the outlet of the fluid withdrawal passage during flow of the fluid through the flow path, to withdraw a minor portion of the fluid and increase the rate of said flow of fluid through the flow path.

3. A fluid flow system according to claim 1, wherein the fluid withdrawal passage has an inlet extending into said flow path from said inner radius convex bounding surface.

4. A fluid flow system according to claim 1, wherein the fluid withdrawal passage has a flared inlet at said inner radius convex bounding surface.

5. A fluid flow system according to claim 1, wherein the fluid withdrawal passage has bounding walls extending from said inner radius convex bounding surface into the flow path.

6. A method according to claim 2, wherein the fluid withdrawal passage has an inlet extending into said flow path from said inner radius convex bounding surface.

7. A method according to claim 2, wherein the fluid withdrawal passage has a flared inlet at said inner radius convex bounding surface.

8. A method according to claim 2, wherein the fluid withdrawal passage has bounding walls extending from said inner radius convex bounding surface into the flow path.

* * * * *